United States Patent
Sato et al.

(10) Patent No.: US 12,497,526 B2
(45) Date of Patent: Dec. 16, 2025

(54) AQUEOUS INKJET INK COMPOSITION, PRINTED MATTER, AND INKJET PRINTING METHOD

(71) Applicant: SAKATA INX CORPORATION, Osaka (JP)

(72) Inventors: Yoichi Sato, Osaka (JP); Kazuki Moriyasu, Osaka (JP); Eri Ueda, Osaka (JP); Takaaki Sano, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 725 days.

(21) Appl. No.: 17/310,442

(22) PCT Filed: Jan. 17, 2020

(86) PCT No.: PCT/JP2020/001512
§ 371 (c)(1),
(2) Date: Aug. 3, 2021

(87) PCT Pub. No.: WO2020/213219
PCT Pub. Date: Oct. 22, 2020

(65) Prior Publication Data
US 2022/0033669 A1    Feb. 3, 2022

(30) Foreign Application Priority Data
Apr. 19, 2019  (JP) .................................. 2019-080036

(51) Int. Cl.
| | | |
|---|---|---|
| C09D 11/322 | (2014.01) | |
| C08K 5/053 | (2006.01) | |
| C08K 5/06 | (2006.01) | |
| C09D 11/033 | (2014.01) | |
| C09D 11/324 | (2014.01) | |

(52) U.S. Cl.
CPC ............ *C09D 11/322* (2013.01); *C08K 5/053* (2013.01); *C08K 5/06* (2013.01); *C09D 11/033* (2013.01); *C09D 11/324* (2013.01)

(58) Field of Classification Search
CPC ... C09D 11/324; C09D 11/033; C09D 11/107; C09D 11/38; C09D 11/322; C08K 5/053; C08K 5/06
See application file for complete search history.

(56) References Cited

U.S. PATENT DOCUMENTS

| | | | |
|---|---|---|---|
| 2015/0184010 A1* | 7/2015 | Okada .................. | C09C 1/3653 428/207 |
| 2015/0329731 A1 | 11/2015 | Fujii et al. | |
| 2017/0002216 A1* | 1/2017 | Sato ....................... | C09D 11/12 |
| 2017/0022380 A1 | 1/2017 | Nakagawa et al. | |
| 2017/0174919 A1 | 6/2017 | Kido et al. | |
| 2018/0030299 A1 | 2/2018 | Yamashita | |
| 2020/0048486 A1 | 2/2020 | Nio et al. | |
| 2020/0199387 A1 | 6/2020 | Utsugi et al. | |
| 2020/0239721 A1 | 7/2020 | Sato et al. | |

FOREIGN PATENT DOCUMENTS

| | | | | |
|---|---|---|---|---|
| CA | 3134096 C | * | 11/2023 | ........... C09D 11/322 |
| EP | 3909772 B1 | * | 4/2025 | ........... C09D 11/033 |
| JP | 2009-190379 A | | 8/2009 | |
| JP | 2016-030776 A | | 3/2016 | |
| JP | 2017-025202 | | 2/2017 | |
| JP | 2018-016739 | | 2/2018 | |
| JP | 2018-104582 A | | 7/2018 | |
| JP | 6424266 B | | 11/2018 | |
| JP | 2018-203802 A | | 12/2018 | |
| JP | 2019-001955 A | | 1/2019 | |
| JP | 7304194 B2 | * | 7/2023 | ........... C09D 11/322 |
| WO | WO 2018/190139 A1 | | 3/2018 | |

OTHER PUBLICATIONS

Office Action in Japanese Patent Application No. 2019-080036, dated Mar. 2, 2023.
Office Action in European Patent Application No. 20 791 639.6, dated Mar. 16, 2023.
Office Action in Canadian Patent Application No. 3,134,096, dated Mar. 23, 2023.
Extended Search Report issued in European Patent Application No. 20791639.6, dated Mar. 2, 2022.
Office Action in Japanese Patent Application No. 2019-080036 dated Apr. 27, 2023.
International Preliminary Report on Patentability in International Application No. PCT/JP2020/001512 issued on Sep. 28, 2021.
Written Opinion of the International Searching Authority in International Application No. PCT/JP2020/001512 mailed on Mar. 31, 2020.
Search Report in International Application No. PCT/JP2020/001512 mailed on Mar. 31, 2020.

* cited by examiner

*Primary Examiner* — Sophie Hon
(74) *Attorney, Agent, or Firm* — KNOBBE, MARTENS, OLSON & BEAR, LLP

(57) ABSTRACT

An aqueous inkjet ink composition including a pigment, an alkali-soluble resin, a surfactant, a water-soluble solvent, and water. The water-soluble solvent contains a solvent A having a boiling point of 100° C. or more and 200° C. or less at 1 atm and 4 or less carbon atoms and 2 or more hydroxy groups in a molecule, and a solvent B having a boiling point of 100° C. or more and 200° C. or less at 1 atm and 4 or more and 10 or less carbon atoms, 1 or less hydroxy groups, and 1 or more methoxy groups in a molecule, and the aqueous inkjet ink composition has a total percentage of the solvent a and the solvent b of 20% by mass or more and 50% by mass or less. The aqueous inkjet ink composition has good storage stability, ejection stability, and drying property of the coating film.

9 Claims, No Drawings

AQUEOUS INKJET INK COMPOSITION, PRINTED MATTER, AND INKJET PRINTING METHOD

This application is the U.S. National Phase under 35 U.S.C. § 371 of International Application PCT/JP2020/001512, filed Jan. 17, 2020, designating the U.S., and published in Japanese as WO 2020/213219 on Oct. 22, 2020, which claims priority to Japanese Patent Application No. 2019-080036, filed Apr. 19, 2019, the entire content of which is incorporated herein by reference.

TECHNICAL FIELD

The present invention relates to an aqueous inkjet ink composition, a printed matter, and an inkjet printing method.

BACKGROUND ART

An inkjet printing/recording method is a printing/recording method in which droplets of an aqueous inkjet ink composition are directly ejected from very fine nozzles and attached onto a printing/recording base material to obtain letters and images.

As such an aqueous inkjet ink composition, for example, a composition containing a pigment, an alkali-soluble resin (resin for pigment dispersion), a surfactant, a specific water-soluble solvent, water and the like is known (Patent Documents 1 to 2). These Patent Documents disclose aqueous inkjet ink compositions having good storage stability and ejection stability.

It is known an ink set including an aqueous inkjet ink composition; and a primer composition containing an aggregation accelerator that accelerates aggregation of the aqueous inkjet ink composition (Patent Documents 3 to 4). It is disclosed that the aqueous inkjet ink compositions in these Patent Documents have good storage stability and ejection stability.

PRIOR ART DOCUMENTS

Patent Documents

Patent Document 1: JP-A-2019-1955
Patent Document 2: JP-A-2018-104582
Patent Document 3: JP-A-2009-190379
Patent Document 4: JP-6424266

SUMMARY OF THE INVENTION

Problems to be Solved by the Invention

Meanwhile, not only uncoated paper such as plain paper and offset paper, but also a non-absorbent print medium such as coated paper and a polyvinyl chloride sheet are used as the printing/recording base material as described above. On such a non-absorbent print medium, the permeation drying of the water-soluble solvent of an aqueous inkjet ink composition is less likely to occur, and thus the decrease in the drying property of the coating film may cause the decrease in image quality, for example, smearing. It has been found that, in particular, the aqueous inkjet ink compositions disclosed in Patent Documents 1 to 4 have room for improvement in such drying property of the coating film.

The present invention has been made in view of the above circumstances, and an object of the present invention is to provide an aqueous inkjet ink composition having good storage stability, ejection stability, and drying property of the coating film.

Means for Solving the Problems

That is, the present invention relates to an aqueous inkjet ink composition, including: a pigment; an alkali-soluble resin; a surfactant; a water-soluble solvent; and water, wherein the water-soluble solvent contains a solvent a having a boiling point of 100° C. or more and 200° C. or less at 1 atm and having 4 or less carbon atoms and 2 or more hydroxy groups in a molecule, and a solvent b having a boiling point of 100° C. or more and 200° C. or less at 1 atm and having 4 or more and 10 or less carbon atoms, 1 or less hydroxy groups, and 1 or more methoxy groups in a molecule, and the aqueous inkjet ink composition has a total percentage of the solvent a and the solvent b of 20% by mass or more and 50% by mass or less.

The present invention also relates to a printed matter obtained by performing printing using the aqueous inkjet ink composition.

The present invention also relates to an inkjet printing method, including the step of: printing an object to be printed on a non-absorbent print medium using the aqueous inkjet ink composition.

Effect of the Invention

Though the details of the mechanism of action of the effect in the aqueous inkjet ink composition of the present invention are partially unknown, they are presumed as follows. However, the interpretation of the present invention does not have to be limited to this mechanism of action.

The aqueous inkjet ink composition of the present invention contains a pigment; an alkali-soluble resin; a surfactant; a water-soluble solvent; and water, and the water-soluble solvent contains a solvent a having a boiling point of 100° C. or more and 200° C. or less at 1 atm and having 4 or less carbon atoms and 2 or more hydroxy groups in a molecule, and a solvent b having a boiling point of 100° C. or more and 200° C. or less at 1 atm and having 4 or more and 10 or less carbon atoms, 1 or less hydroxy groups, and 1 or more methoxy groups in a molecule. When the water-soluble solvent contained in the aqueous inkjet ink composition contains only the solvent a, the coating film slowly dries, and when the water-soluble solvent contained in the aqueous inkjet ink composition contains only the solvent b, the storage stability is poor. Thus, by using a specific amount of the solvent a and a specific amount of the solvent b in combination, the aqueous inkjet ink composition of the present invention has storage stability, ejection stability, and drying property of the coating film in a well-balanced manner.

MODE FOR CARRYING OUT THE INVENTION

The aqueous inkjet ink composition of the present invention contains a pigment, an alkali-soluble resin, a surfactant, a water-soluble solvent, and water.

<Pigment>

As the pigment of the present invention, an organic pigment or an inorganic pigment used in an ink composition for ink jet printing can be used without particular limitation. Examples of the organic pigment include dye lake pigments, azo pigments, benzimidazolone pigments, phthalocyanine pigments, quinacridone pigments, anthraquinone pigments, dioxazine pigments, indigo pigments, thioindico pigments, perylene pigments, perinone pigments, diketopyrrolopyrrole pigments, isoindolinone pigments, nitro pigments, nitroso pigments, anthraquinone pigments, flavanthrone pigments, quinophthalone pigments, pyranthrone pigments, and indanthrone pigments. Examples of the inorganic pigment include carbon black, titanium oxide, zinc oxide, red iron oxide, graphite, black iron oxide, chrome oxide green, and aluminum hydroxide. The pigment can be surface-treated with a known surface treatment agent. The pigment can be used singly or in combination of two or more types.

Specific examples of the pigment based on typical hues include the following.

Examples of yellow pigments include C. I. Pigment Yellows 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, and 213.

Examples of magenta pigments include C. I. Pigment Reds 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, and 270, and C. I. Pigment Violet 19.

Examples of cyan pigments include C. I. Pigment Blues 1, 2, 3, 15, 15:1, 15:2, 15:3, 15:4, 15:6, 16, 18, 22, 27, 29, and 60.

Examples of black pigments include carbon black (C. I. Pigment Black 7).

Examples of white pigments include titanium oxide and aluminum oxide, and the white pigments can be surface-treated with various materials such as alumina and silica.

<Alkali-Soluble Resin<

The alkali-soluble resin of the present invention is an ordinary alkali-soluble resin that can be used for pigment dispersion of inks and paints or as a binder, is not particularly limited as long as the alkali-soluble resin can be dissolved in an aqueous medium in the presence of a basic compound, and is preferably a resin containing one type or two or more types of anionic groups such as a carboxyl group, a sulfonic group, and a phosphonic acid group ($—P(=O)(OH_2)$).

The alkali-soluble resin preferably further has a hydrophobic moiety for improving the adsorption mainly on the pigment in the molecule. Examples of the hydrophobic moiety introduced into the molecule include hydrophobic groups such as a long-chain alkyl group and an alicyclic or aromatic cyclic hydrocarbon group.

The acid value of the alkali-soluble resin is preferably 40 mgKOH/g or more, and more preferably 70 mgKOH/g or more from the viewpoint of increasing the solubility in an aqueous medium. The acid value of the alkali-soluble resin is preferably 300 mgKOH/g or less, and more preferably 250 mgKOH/g or less from the viewpoint of improving the water resistance of a printed matter. The acid value is a theoretical acid value of the mg number of potassium hydroxide theoretically required to neutralize 1 g of the alkali-soluble resin arithmetically determined based on the composition of the monomer used for synthesizing the alkali-soluble resin.

The glass transition temperature of the alkali-soluble resin is preferably 0° C. or more, and more preferably 10° C. or more from the viewpoint of improving the blocking resistance of a printed matter. The glass transition temperature of the alkali-soluble resin is preferably 100° C. or less, and more preferably 80° C. or less from the viewpoint of improving the folding resistance of a printed matter.

The glass transition temperature of the alkali-soluble resin is a theoretical glass transition temperature determined by the following wood formula when the alkali-soluble resin is an acrylic copolymer resin.

$$1/Tg = W1/Tg1 + W2/Tg2 + W3/Tg3 + \ldots + Wx/Tgx \quad \text{Wood formula:}$$

[In the formula, Tg1 to Tgx represent the glass transition temperature of each homopolymer of the monomers 1, 2, 3 . . . x that constitute the alkali-soluble resin, W1 to Wx represent each polymerization fraction of monomers 1, 2, 3 . . . x, and Tg represents the theoretical glass transition temperature. The glass transition temperature in the wood formula is an absolute temperature.]

The glass transition temperature of the alkali-soluble resin is a theoretical glass transition temperature determined by thermal analysis when the alkali-soluble resin is other than acrylic copolymer resins. For the method of thermal analysis, the glass transition temperature can be measured according to JIS K7121 (Testing Methods for Transition Temperatures of Plastics), as an example, using Pyris1 DSC manufactured by PerkinElmer Co., Ltd. under the conditions of a rate of temperature rise of 20° C./min and a nitrogen gas flow rate of 20 ml/min.

The weight average molecular weight of the alkali-soluble resin is preferably 5,000 or more, and more preferably 10,000 or more from the viewpoint of improving the water resistance of a printed matter. The weight average molecular weight of the alkali-soluble resin is preferably 100,000 or less and more preferably 50,000 or less from the viewpoint of increasing the solubility in an aqueous medium.

The weight average molecular weight can be measured by gel permeation chromatography (GPC) method. As an example, chromatography is performed using Water 2690 (manufactured by Waters Corporation) as a GPC instrument, and PLgel, 5μ, and MIXED-D (manufactured by Polymer Laboratories) as a column under the conditions of a tetrahydrofuran as a developing solvent, a column temperature of 25° C., a flow rate of 1 ml/min, an RI detector, a sample injection concentration of 10 milligrams/milliliter, and an injection amount of 100 microliters, and the weight average molecular weight can be determined in terms of polystyrene.

Examples of the alkali-soluble resin include acrylic copolymer resins, maleic acid copolymer resins, polyester resins obtained by condensation polymerization reaction, and polyurethane resins. Materials for synthesizing such alkali-soluble resins are disclosed, for example, in JP-A-2000-94825, and acrylic copolymer resins, maleic acid copolymer resins, polyester resins, polyurethane resins and the like that are obtained using the materials described in the publication can be used. Further, resins obtained using other materials other than these materials can also be used. The alkali-soluble resin can be used singly or in combination of two or more types.

As the acrylic copolymer resin, for example, one obtained by polymerizing a mixture of other monomers copolymerizable with an anionic group-containing monomer in a solvent in the presence of an ordinary radical generator (for example, benzoyl peroxide, tertiary butyl peroxybenzoate, azobisisobutyronitrile and the like) can be used.

Examples of the anionic group-containing monomer include monomers having at least one type of anionic group selected from the group consisting of a carboxyl group, a sulfonic group, and a phosphonic acid group, and among these, monomers having a carboxyl group are particularly preferable.

Examples of the monomers having a carboxyl group include acrylic acid, methacrylic acid, crotonic acid, itaconic acid, maleic acid, fumaric acid, 2-carboxyethyl (meth)acrylate, 2-carboxypropyl (meth)acrylate, maleic anhydride, fumaric anhydride, and maleic acid half ester. Examples of the monomers having a sulfonic group include sulfoethyl methacrylate. Examples of the monomers having a phosphonic acid group include phosphonoethyl methacrylate.

The other monomers copolymerizable with an anionic group-containing monomer described above preferably include a hydrophobic group-containing monomer from the viewpoint of improving the adsorption on the pigment.

Examples of the hydrophobic group-containing monomer include, as a monomer having a long-chain alkyl group, alkyl esters having 8 or more carbon atoms of a radically polymerizable unsaturated carboxylic acid such as (meth)acrylic acid (for example, 2-ethylhexyl (meth)acrylate, octyl (meth)acrylate, lauryl (meth)acrylate, stearyl (meth)acrylate, 2-hydroxystearyl (meth)acrylate and the like), alkyl vinyl ethers having 8 or more carbon atoms (for example, dodecyl vinyl ether and the like), and vinyl esters of a fatty acid having 8 or more carbon atoms (for example, vinyl 2-ethylhexanoate, vinyl laurate, vinyl stearate and the like); as a monomer having an alicyclic hydrocarbon group, cyclohexyl (meth)acrylate; and as a monomer having an aromatic hydrocarbon group, styrene monomers such as benzyl (meth)acrylate, styrene, α-methylstyrene, and vinyltoluene. The hydrophobic group-containing monomer can be used singly or in combination of two or more types.

The other monomers copolymerizable with an anionic group-containing monomer described above can include a hydrophilic group-containing monomer from the viewpoint of suppressing aggregation of the alkali-soluble resin in an aqueous medium.

Examples of the hydrophilic group-containing monomer include, as a monomer having a (poly)oxyalkylene chain, esterified products of a (poly)alkylene glycol in which one terminal is capped with alkyl such as methoxy polyethylene glycol, methoxy polyethylene polypropylene glycol, ethoxy polyethylene glycol, ethoxy polyethylene polypropylene glycol, propoxy polyethylene glycol, and propoxy polyethylene polypropylene glycol, and a radically polymerizable unsaturated carboxylic acid such as (meth)acrylic acid, and ethylene oxide adducts and/or propylene oxide adducts of a radically polymerizable unsaturated carboxylic acid such as (meth)acrylic acid; as a basic group-containing monomer, vinylpyrrolidones such as 1-vinyl-2-pyrrolidone and 1-vinyl-3-pyrrolidone, vinylpyridines such as 2-vinylpyridine, 4-vinylpyridine, 5-methyl-2-vinylpyridine, and 5-ethyl-2-vinylpyridine, vinyl imidazoles such as 1-vinyl imidazole and 1-vinyl-2-methylimidazole, vinylpiperidines such as 3-vinylpiperidine and N-methyl-3-vinylpiperidine, nitrogen-containing derivatives of (meth)acrylic acid such as dimethylaminoethyl (meth)acrylate, diethylaminoethyl (meth)acrylate, tertiary-butylaminoethyl (meth)acrylate, (meth)acrylamide, N-methylol (meth)acrylamide, N-butoxymethyl (meth)acrylamide, N-methoxy (meth)acrylamide, N-ethoxy (meth)acrylamide, N-dimethylacrylamide, and N-propylacrylamide; as a monomer having a hydroxyl group, hydroxyalkyl esters of (meth)acrylic acid such as hydroxyethyl (meth)acrylate and hydroxypropyl (meth)acrylate; and as a monomer having an epoxy group, glycidyl (meth)acrylate. The hydrophilic group-containing monomer can be used singly or in combination of two or more types.

Examples of the hydrophobic group-containing monomer and other copolymerizable monomers other than hydrophilic group-containing monomers include alkyl esters having less than 8 carbon atoms of (meth)acrylic acid such as methyl (meth)acrylate, ethyl (meth)acrylate, propyl (meth)acrylate, isopropyl (meth)acrylate, butyl (meth)acrylate, and hexyl (meth)acrylate. The hydrophobic group-containing monomer and other copolymerizable monomers other than hydrophilic group-containing monomers can be used singly or in combination of two or more types.

[Surfactant]

As the surfactant of the present invention, a known surfactant used in an aqueous inkjet ink composition can be used without particular limitation, and examples thereof include a nonionic surfactant, a cationic surfactant, an anionic surfactant, and a betaine surfactant. Specific examples of the surfactant include a silicone surfactant, a fluorine surfactant, and an acetylene surfactant. The surfactant can be used singly or in combination of two or more types.

Examples of the anionic surfactant include an alkyl sulfonate, a polyoxyethylene alkyl ether sulfate, an alkylbenzene sulfonate, and an alkyl carboxylate, and examples of the commercially available product include LATEMUL PS (alkyl sulfonate, manufactured by Kao Corporation) and Sandead EN (polyoxyethylene alkyl ether sulfate, manufactured by SANYO CHEMICAL INDUSTRIES, LTD.).

Examples of the silicone surfactant include "BYK-307", "BYK-333", "BYK-347", "BYK-348", "BYK-349", "BYK-345", "BYK-378", and "BYK-3455" (all manufactured by BYK).

Examples of the fluorine surfactant include "F-410", "F-444", and "F-553" (all manufactured by DIC CORPORATION), and "FS-65", "FS-34", "FS-35", "FS-31", and "FS-30" (all manufactured by DuPont).

Examples of the acetylene surfactant include "Dynol 607", "Dynol 609", "Orphin E1004", "Orphin E1010", "Orphin E1020", "Orphin PD-001", "Orphin PD-002W", "Orphin PD-004", "Orphin PD-005", "Orphin EXP.4001", "Orphin EXP.4200", "Orphin EXP.4123", and "Orphin EXP.4300" (all manufactured by Nissin Chemical co., ltd.); and "SURFYNOL 104E", "SURFYNOL 104H", "SURFYNOL 104A", "SURFYNOL 104BC", "SURFYNOL 104DPM", "SURFYNOL 104PA", "SURFYNOL 104PG-50", "SURFYNOL 420", "SURFYNOL 440", and "SURFYNOL 465" (all manufactured by Evonik Industries AG).

<Water-Soluble Solvent>

The water-soluble solvent of the present invention contains a solvent a having a boiling point of 100° C. or more and 200° C. or less at 1 atm and having 4 or less carbon atoms and 2 or more hydroxy groups in a molecule, and a solvent b having a boiling point of 100° C. or more and 200° C. or less at 1 atm and having 4 or more and 10 or less carbon atoms, 1 or less hydroxy groups, and 1 or more methoxy groups in a molecule. The solvent a and the solvent b preferably have an amount of dissolution in 100 g of water at 20° C. of 50 g or more.

Examples of the solvent a include propylene glycol (boiling point: 188° C.), 1,2-butanediol (boiling point: 197° C.), and ethylene glycol (boiling point: 197° C.). Among them, propylene glycol and 1,2-butanediol are preferable from the viewpoint of preventing harmfulness. The solvent a can be used singly or in combination of two or more types.

Examples of the solvent b include dipropylene glycol dimethyl ether (boiling point: 175° C.), 3-methoxy-3-methyl-1-butanol (boiling point: 174° C.), and propylene glycol monomethyl ether (boiling point: 121° C.). Among them, dipropylene glycol dimethyl ether and 3-methoxy-3-methyl-1-butanol are preferable from the viewpoint of preventing harmfulness. The solvent b can be used singly or in combination of two or more types.

The mass ratio of the solvent a to the solvent b (solvent a/solvent b) is preferably 0.1 or more and 10 or less. The mass ratio of the solvent a to the solvent b (solvent a/solvent b) is preferably 0.5 or more, and more preferably 0.8 or more from the viewpoint of improving the storage stability and ejection stability, and is more preferably 5 or less, and still more preferably 3 or less from the viewpoint of improving the drying property of the coating film.

The water-soluble solvent of the present invention can contain a known water-soluble solvent used in an aqueous inkjet ink composition other than the solvent a and the solvent b (other water-soluble solvents). Examples of the other water-soluble solvents include monoalcohols, polyhydric alcohols, lower alkyl ethers of polyhydric alcohols, nitrogen-containing compounds, ketones, ethers, esters, and amides as described in JP-A-2019-1955.

The total percentage of the solvent a and the solvent b in the water-soluble solvent is preferably 70% by mass or more, more preferably 80% by mass or more, still more preferably 85% by mass or more, still more preferably 90% by mass or more, and still more preferably 95% by mass or more, from the viewpoint of improving the drying property of the coating film.

<Water>

The water of the present invention includes water as an aqueous medium contained in a pigment dispersion described later, and water added for adjusting the concentration of the aqueous inkjet ink composition of the present invention. Examples of the water include ion exchanged water, pure water, distilled water, and industrial water. The water can be used singly or in combination of two or more types.

Hereinafter, the percentage of each component in the aqueous inkjet ink composition of the present invention will be described.

The percentage of the pigment in the aqueous inkjet ink composition of the present invention is preferably 1% by mass or more, and more preferably 2% by mass or more from the viewpoint of improving the print density of a printed matter, and is preferably 10% by mass or less, and more preferably 8% by mass or less from the viewpoint of improving ejection stability. However, when the pigment is a white pigment, the percentage of the white pigment in the aqueous inkjet ink composition of the present invention is preferably 4% by mass or more, and more preferably 8% by mass or more, and is preferably 30% by mass or less, and more preferably 20% by mass or less.

The content of the alkali-soluble resin is preferably 5 parts by mass or more, and more preferably 15 parts by mass or more relative to 100 parts by mass of the pigment from the viewpoint of increasing the dispersibility of the pigment. The content of the alkali-soluble resin is preferably 100 parts by mass or less, more preferably 80 parts by mass or less, and still more preferably 60 parts by mass or less relative to 100 parts by mass of the pigment from the viewpoint of reducing the viscosity of the aqueous composition for ink jet printing.

The percentage of the surfactant in the aqueous inkjet ink composition of the present invention is preferably 0.1% by mass or more, and more preferably 0.5% by mass or more from the viewpoint of improving dot expandability and solid uniformity of printed matter, and is preferably 3% by mass or less, and more preferably 2% by mass or less from the viewpoint of improving storage stability.

The total percentage of the solvent a and the solvent b in the aqueous inkjet ink composition of the present invention is 20% by mass or more and 50% by mass or less. The total percentage of the solvent a and the solvent b in the aqueous inkjet ink composition of the present invention is preferably 25% by mass or more from the viewpoint of improving the ejection stability, and is preferably 45% by mass or less from the viewpoint of improving the drying property of the coating film.

The percentage of the water-soluble solvent in the aqueous inkjet ink composition of the present invention is preferably 15% by mass or more, and more preferably 20% by mass or more from the viewpoint of improving the ejection stability, and is preferably 60% by mass or less, and more preferably 50% by mass or less from the viewpoint of improving the drying property of the coating film.

The percentage of the water (including water contained in each component) in the aqueous inkjet ink composition of the present invention is preferably 40% by mass or more, and more preferably 50% by mass or more from the viewpoint of improving the drying property of the coating film, and is preferably 70% by mass or less, and more preferably 60% by mass or less from the viewpoint of improving the ejection stability.

<Basic Compound>

The aqueous inkjet ink composition of the present invention preferably contains a basic compound from the viewpoint of dissolving the alkali-soluble resin. Examples of the basic compound include inorganic basic compounds such as sodium hydroxide and potassium hydroxide; and organic basic compounds such as ammonia, methylamine, ethylamine, monoethanolamine, N,N-dimethylethanolamine, N,N-diethylethanolamine, N,N-dibutylethanolamine, diethanolamine, N-methyldiethanolamine, triethanolamine, morpholine, N-methylmorpholine, and N-ethylmorpholine. The basic compound can be used singly or in combination of two or more types.

The percentage of the basic compound in the aqueous inkjet ink composition of the present invention can be an amount at which the alkali-soluble resin can be dissolved in a medium, is usually preferably 0.05% by mass or more, and more preferably 0.1% by mass or more from the viewpoint of increasing the dispersion stability of the alkali-soluble resin, and is preferably 1% by mass or less, and more preferably 0.5% by mass or less from the viewpoint of increasing the water resistance of a printed matter.

To the aqueous inkjet ink composition of the present invention, additives such as a known resin, a resin emulsion, a wax emulsion, a pigment dispersant, a mildewproofing agent, a rust inhibitor, a thickener, an antioxidant, an ultraviolet absorber, a preservability improver, an antifoaming agent, and a pH adjuster can be further added depending on the purpose.

<Method for Preparing Aqueous Inkjet Ink Composition>

The method for preparing (producing) the aqueous inkjet ink composition of the present invention is not particularly limited, and the above-mentioned components can be added in order or simultaneously and mixed. Examples thereof include method 1) in which an aqueous resin varnish in which an alkali-soluble resin is dissolved in water in the presence of the basic compound, a pigment, and if necessary, a pigment dispersant and the like are mixed, then a pigment dispersion (ink base) is prepared using various dispersers such as a ball mill, an attritor, a roll mill, a sand mill, and an agitator mill, and the remaining materials are further added to prepare an aqueous inkjet ink composition; and method (2) in which a pigment is dispersed by the above-mentioned method, then a resin-coated pigment in which an alkali-soluble resin is deposited on a pigment surface is obtained by, for example, an acid deposition method or an ion exchange method described in Republished patent WO 2005/116147, then the obtained resin-coated pigment is neutralized with a basic compound and redispersed in water using various dispersers (such as a high-speed stirrer), and the remaining materials are further added to prepare an aqueous ink composition for inkjet.

The aqueous inkjet ink composition of the present invention has an initial viscosity after production of 2.0 to 15.0 mPa·s, and preferably has an initial viscosity after production of 3.0 to 12.0 mPa·s. The viscosity can be measured by, for example, an E-type viscometer (trade name: RE 100 L type viscometer, manufactured by TOKI SANGYO CO., LTD).

<Printed Matter>

The printed matter of the present invention is obtained by performing printing using the aqueous inkjet ink composition. Specifically, the printed matter of the present invention is obtained by applying (printing) the aqueous inkjet ink composition onto a base material using an inkjet printer.

Examples of the base material include non-absorbent print media such as coated paper such as art paper, inkjet dedicated paper, and inkjet glossy paper, and plastic base materials such as a polyvinyl chloride sheet; uncoated paper such as plain paper and offset paper; and a fabric of, for example, cotton.

<Inkjet Printing Method>

As the inkjet printing method of the present invention, conventionally known conditions can be appropriately adopted, and examples thereof include a method in which inkjet printing is performed by housing the aqueous inkjet ink composition in an ink cartridge, attaching the ink cartridge to an inkjet recording apparatus of, for example, a single pass system, and ejecting the aqueous inkjet ink composition from a nozzle to a base material.

The aqueous inkjet ink composition of the present invention has good storage stability, ejection stability, and drying property of the coating film, and thus can be used singly, or can be used as an ink set together with a primer composition containing an aggregation accelerator that accelerates aggregation of the aqueous inkjet ink composition.

EXAMPLES

Hereinafter, the present invention will be described with reference to Examples and the like, but the present invention is not limited thereto.

Production Example 1

<Production of Pigment Dispersion (Black Ink Base)>

An alkali-soluble resin (acrylic acid/n-butyl acrylate/benzyl methacrylate/styrene copolymer), a weight average molecular weight of 30,000, an acid value of 185 mgKOH/g, a glass transition temperature of 40° C.) (20 parts by mass) was dissolved in a mixed solution of 2.5 parts by mass of potassium hydroxide and 77.5 parts by mass of water to obtain an aqueous resin varnish having a solid content of the alkali-soluble resin of 20% by mass.

Then, 64.3 parts by mass of water was added to and mixed with 23.7 parts by mass of the aqueous resin varnish to prepare a resin varnish for pigment dispersion. To this resin varnish for pigment dispersion, 12 parts by mass of carbon black (trade name: "Printex 90", manufactured by Degussa AG) as a pigment was further added, and the mixture was stirred and mixed and then milled with a wet circulation mill to produce a black pigment dispersion (black ink base) of Production Example 1.

Production Examples 2 to 4

<Production of Pigment Dispersion (Yellow, Magenta, and Cyan Ink Bases)>

A yellow pigment dispersion (yellow ink base) of Production Example 2, a magenta pigment dispersion (magenta ink base) of Production Example 3, and a cyan pigment dispersion (cyan ink base) of Production Example 4 were produced in the same method as in Production Example 1 except that a yellow pigment (trade name: Novoperm Yellow 4G01, manufactured by Clariant), a magenta pigment (trade name: "Inkjet magenta E5B02", manufactured by Clariant), or a cyan pigment (trade name: Heliogen Blue L 7101 F, manufactured by BASF SE) was used instead of the carbon black (trade name: "Printex 90", manufactured by Degussa AG) described in Production Example 1.

Production Example 5

<Production of Pigment Dispersion (White Ink Base)>

Water (20.0 parts by mass) was added to and mixed with 40.0 parts by mass of the aqueous resin varnish described in Production Example 1 to prepare a resin varnish for pigment dispersion. To this resin varnish for pigment dispersion, 40 parts by mass of titanium oxide (trade name: "R-960", manufactured by DuPont) as a pigment was further added, and the mixture was stirred and mixed and then milled with a wet circulation mill to produce a white pigment dispersion (white ink base) of Production Example 5.

Example 1

<Production of Aqueous Inkjet Ink Composition>

The black pigment dispersion (black ink base), propylene glycol as the solvent a, dipropylene glycol dimethyl ether as the solvent b, an acetylene surfactant (trade name "SURFYNOL 465" (solid content: 100%, HLB13, manufactured by Evonik Industries AG) as a surfactant, and water were stirred and mixed so that the mass ratio in Table 1 would be achieved to produce the aqueous inkjet ink composition of Example 1.

Examples 2 to 10, Comparative Examples 1 to 9

<Production of Aqueous Inkjet Ink Composition>

The aqueous inkjet ink compositions of Examples 2 to 10 and Comparative Examples 1 to 9 were produced in the same method as in Example 1 except that the raw materials used and the amounts thereof were changed as shown in Table 1 in each Example and each Comparative Example.

<Evaluation of Aqueous Inkjet Ink Composition>

Evaluation was performed by the following method, and the results are shown in Table 1.

<Storage Stability of Ink Composition>

Each of the aqueous inkjet ink compositions for ink jet printing produced above was placed in a glass bottle, and the viscosity (mPa·s) at 25° C. was measured using a viscometer ("RE100 L type" manufactured by TOKI SANGYO CO., LTD. Then, the glass bottle was tightly stopped and stored at 60° C. for 1 month, and the viscosity (25° C.) after storage was measured with a viscometer. The storage stability was evaluated by the rate of viscosity change (60° C., (viscosity after 1 month–viscosity before storage)/viscosity before storage).

[Evaluation Criteria of Storage Stability]
○: Rate of viscosity change of less than 5%
Δ: Rate of viscosity change of 5% or more and less than 10%
x: Rate of viscosity change of 10% or more <Ejection Stability of Ink Composition>

The aqueous inkjet ink composition produced above was packed in a cartridge of an inkjet printer ("PX105", manufactured by Seiko Epson Corp.), printing was performed on photo paper ("GL-101A450", manufactured by Canon Inc.), and ejection stability was evaluated.

[Evaluation Criteria of Ejection Stability]
○: There is almost no printing disorder and ejection can be stably performed.
Δ: There is some printing disorder, but ejection can be performed.
x: There is printing disorder, and ejection cannot be stably performed.

<Drying Property of Coating Film of Ink Composition>

The aqueous inkjet ink composition produced above was packed in a cartridge of an inkjet printer ("PX105", manufactured by Seiko Epson Corp.), printing was performed on OK top coat paper (manufactured by Oji Paper Co., Ltd.), the printed matter was allowed to stand at 80° C. for 3 minutes to dry the ink, and a print part was rubbed with a cotton swab to evaluate drying property of the coating film.

[Evaluation Criteria of Drying Property of Coating Film]
○: Ink does not adhere to cotton swab at all
Δ: Small amount of ink adheres to cotton swab
x: Large amount of ink adheres cotton swab

TABLE 1

| | | | | Examples | | | | | | | | | |
|---|---|---|---|---|---|---|---|---|---|---|---|---|---|
| | | | | 1 | 2 | 3 | 4 | 5 | 6 | 7 | 8 | 9 | 10 |
| Aqueous inkjet ink composition | Pigment dispersion (Ink base) | Production Example 1 | Black ink base | 34 | — | — | — | — | 34 | 34 | 25 | 34 | 34 |
| | | Production Example 2 | Yellow ink base | — | 34 | — | — | — | — | — | — | — | — |
| | | Production Example 3 | Magenta ink base | — | — | 34 | — | — | — | — | — | — | — |
| | | Production Example 4 | Cyan ink base | — | — | — | 25 | — | — | — | — | — | — |
| | | Production Example 5 | White ink base | — | — | — | — | 25 | — | — | — | — | — |
| | Solvent a | Propylene glycol | | 20 | 20 | 20 | 21 | 17 | 36 | 4 | 25 | — | 20 |
| | | 1,2-butanediol | | — | — | — | — | — | — | — | — | 20 | — |
| | Solvent b | Dipropylene glycol dimethyl ether | | 20 | 20 | 20 | 21 | 16 | 4 | 36 | 25 | 20 | — |
| | | 3-methoxy-3-methyl-1-butanol | | — | — | — | — | — | — | — | — | — | 20 |
| | Other water-soluble solvents | 1,3-propanediol | | — | — | — | — | — | — | — | — | — | — |
| | | 1,3-butanediol | | — | — | — | — | — | — | — | — | — | — |
| | | Butyl cellosolve | | — | — | — | — | — | — | — | — | — | — |
| | | Triethylene glycol monobutyl ether | | — | — | — | — | — | — | — | — | — | — |
| | | Diethylene glycol monobutyl ether | | — | — | — | — | — | — | — | — | — | — |
| | | Ethylene glycol dimethyl ether | | — | — | — | — | — | — | — | — | — | — |
| | Surfactant | | | 1 | 1 | 1 | 1 | 1 | 1 | 1 | 1 | 1 | 1 |
| | Water | | | 25 | 25 | 25 | 32 | 41 | 25 | 25 | 24 | 25 | 25 |
| | Total | | | 100 | 100 | 100 | 100 | 100 | 100 | 100 | 100 | 100 | 100 |
| Evaluation results | Storage stability | | Numerical value (%) | 3.2 | 2.5 | 3.0 | 2.0 | 2.0 | 3.7 | 6.6 | 2.7 | 3.3 | 3.1 |
| | | | Evaluation | ○ | ○ | ○ | ○ | ○ | ○ | Δ | ○ | ○ | ○ |
| | Ejection stability | | Evaluation | ○ | ○ | ○ | ○ | ○ | ○ | Δ | ○ | ○ | ○ |
| | Drying property of coating film | | Evaluation | ○ | ○ | ○ | ○ | ○ | Δ | ○ | Δ | ○ | ○ |

| | | | | Comparative Examples | | | | | | | | |
|---|---|---|---|---|---|---|---|---|---|---|---|---|
| | | | | 1 | 2 | 3 | 4 | 5 | 6 | 7 | 8 | 9 |
| Aqueous inkjet ink composition | Pigment dispersion (Ink base) | Production Example 1 | Black ink base | 34 | 34 | 17 | 34 | 34 | 34 | 34 | 34 | 34 |
| | | Production Example 2 | Yellow ink base | — | — | — | — | — | — | — | — | — |
| | | Production Example 3 | Magenta ink base | — | — | — | — | — | — | — | — | — |
| | | Production Example 4 | Cyan ink base | — | — | — | — | — | — | — | — | — |
| | | Production Example 5 | White ink base | — | — | — | — | — | — | — | — | — |
| | Solvent a | Propylene glycol | | 40 | — | 30 | — | — | 20 | 20 | 20 | 20 |
| | | 1,2-butanediol | | — | — | — | — | — | — | — | — | — |
| | Solvent b | Dipropylene glycol dimethyl ether | | — | 40 | 30 | 20 | 20 | — | — | — | — |
| | | 3-methoxy-3-methyl-1-butanol | | — | — | — | — | — | — | — | — | — |
| | Other water-soluble solvents | 1,3-propanediol | | — | — | — | 20 | — | — | — | — | — |
| | | 1,3-butanediol | | — | — | — | — | 20 | — | — | — | — |
| | | Butyl cellosolve | | — | — | — | — | — | 20 | — | — | — |
| | | Triethylene glycol monobutyl ether | | — | — | — | — | — | — | 20 | — | — |
| | | Diethylene glycol monobutyl ether | | — | — | — | — | — | — | — | 20 | — |
| | | Ethylene glycol dimethyl ether | | — | — | — | — | — | — | — | — | 20 |
| | Surfactant | | | 1 | 1 | 1 | 1 | 1 | 1 | 1 | 1 | 1 |
| | Water | | | 25 | 25 | 22 | 25 | 25 | 25 | 25 | 25 | 25 |
| | Total | | | 100 | 100 | 100 | 100 | 100 | 100 | 100 | 100 | 100 |
| Evaluation results | Storage stability | | Numerical value (%) | 3.3 | 12.2 | 3.2 | 3.3 | 3.4 | 12.4 | 3.6 | 4.7 | 6.8 |
| | | | Evaluation | ○ | x | ○ | ○ | ○ | x | ○ | ○ | Δ |
| | Ejection stability | | Evaluation | ○ | Δ | ○ | ○ | ○ | x | ○ | ○ | x |
| | Drying property of coating film | | Evaluation | x | ○ | x | x | x | ○ | x | x | ○ |

The invention claimed is:

1. An aqueous inkjet ink composition, comprising:
a pigment;
an alkali-soluble resin;
a surfactant;
a water-soluble solvent; and
water,
wherein a glass transition temperature of the alkali-soluble resin is 0° C. or more and 100° C. or less, an acid value of the alkali-soluble resin is 40 mgKOH/g or more and 300 mgKOH/g or less, and the alkali-soluble resin is an acrylic copolymer resin comprised of alkyl ester monomer units each having 8 or more carbon atoms as a structural unit,
wherein the water-soluble solvent contains a solvent A selected from the group consisting of propylene glycol and 1,2-butanediol, and a solvent B selected from the group consisting of dipropylene glycol dimethyl ether and 3-methoxy-3-methyl-1-butanol, wherein the total percentage of the solvent A and the solvent B in the water-soluble solvent is 70% by mass or more, wherein a mass ratio of the solvent A to the solvent B (solvent A/solvent B) of 0.8 or more and 3 or less, and
wherein the aqueous inkjet ink composition has a total percentage of the solvent A and the solvent B of 20% by mass or more and 50% by mass or less.

2. A printed matter obtained by performing printing using the aqueous inkjet ink composition according to claim 1.

3. An inkjet printing method, comprising printing an object to be printed on a non-absorbent print medium using the aqueous inkjet ink composition according to claim 1.

4. The aqueous inkjet ink composition according to claim 1, wherein the total percentage of the solvent A and the solvent B in the water-soluble solvent is 80% by mass or more.

5. The aqueous inkjet ink composition according to claim 1, wherein the total percentage of the solvent A and the solvent B in the water-soluble solvent is 85% by mass or more.

6. The aqueous inkjet ink composition according to claim 1, wherein the total percentage of the solvent A and the solvent B in the water-soluble solvent is 90% by mass or more.

7. The aqueous inkjet ink composition according to claim 1, wherein the total percentage of the solvent A and the solvent B in the water-soluble solvent is 95% by mass or more.

8. The aqueous inkjet ink composition according to claim 1, wherein the pigment is selected from the group consisting of a yellow pigment, magenta pigment, cyan pigment, black pigment and white pigment.

9. The aqueous inkjet ink composition according to claim 1, wherein the surfactant is selected from the group consisting of a nonionic surfactant, a cationic surfactant, an anionic surfactant and a betaine surfactant.

* * * * *